United States Patent [19]

Senger

[11] Patent Number: 6,090,000
[45] Date of Patent: Jul. 18, 2000

[54] EMERGENCY HYDRAULIC CONTROL FOR CONTINUOUSLY VARIABLE TRANSMISSION WITH EXPANDED MANUALLY-OPERATED VALVE

[75] Inventor: Karl-Heinz Senger, Loechgau, Germany

[73] Assignee: Robert Bosch GmbH, Stuttgart, Germany

[21] Appl. No.: 09/142,491

[22] Filed: Sep. 8, 1998

[30] Foreign Application Priority Data

Mar. 13, 1996 [DE] Germany ............... 196 09 787

[51] Int. Cl.[7] ............ F16H 59/00; F16H 61/00; F16H 63/00
[52] U.S. Cl. .................. 474/18; 474/28; 474/70
[58] Field of Search .................. 474/69, 70, 8, 474/11, 12, 18, 28; 60/487–494

[56] References Cited

U.S. PATENT DOCUMENTS

| | | | |
|---|---|---|---|
| 4,685,358 | 8/1987 | Itoh | 74/868 |
| 4,752,277 | 6/1988 | Morimoto | 474/70 |
| 5,217,412 | 6/1993 | Indlekofer et al. | 474/69 |
| 5,249,422 | 10/1993 | Smith et al. | 60/426 |
| 5,787,710 | 8/1998 | Baeuerle | 60/468 |
| 5,802,847 | 9/1998 | Harnischfeger | 60/413 |
| 5,885,178 | 3/1999 | Luh | 474/28 |
| 5,930,997 | 8/1999 | Hayashi et al. | 60/468 |
| 5,937,729 | 8/1999 | Spiess et al. | 474/28 |
| 5,944,626 | 8/1999 | Spiess et al. | 474/28 |

FOREIGN PATENT DOCUMENTS

| | | |
|---|---|---|
| 324928 | 7/1989 | European Pat. Off. . |
| 435563 | 7/1991 | European Pat. Off. . |
| 4138378 | 8/1992 | Germany . |
| 42 34 103 C2 | 7/1995 | Germany . |
| 195 19 162 A1 | 11/1996 | Germany . |

*Primary Examiner*—Mary Ann Battista
*Assistant Examiner*—Matthew A. Kaness
*Attorney, Agent, or Firm*—Michael J. Striker

[57] ABSTRACT

An emergency hydraulic control is provided for a transmission-dependent change of the hydraulic fluid pressures in a first and second hydraulic conical disk axial displacement of a continuously variable transmission, wherein a pump supplies at least the piston chamber of a second axial displacement, and a downstream-connected remote-controlled differential pressure regulator and at least one electro-magnetically actuable pressure relief valve limits the fluid pressure there, and feed from this supply the piston chamber of a first axial displacement, as well as a remote control having an opening function leading to the valve via the remote-control line, via a continuous way valve, whose opening movement into the flow-through position is controlled with the aid of the pressure present upstream of the valve, wherein at least the individual driving states such as forward running, reverse running and idling, can be selected by means of appropriate switching positions of an manual switching valve; and in case of an outage of the electronic control device, the driver has available, besides an "overdrive" gear, a fixed "low gear for starting of an incline, among others.

6 Claims, 1 Drawing Sheet

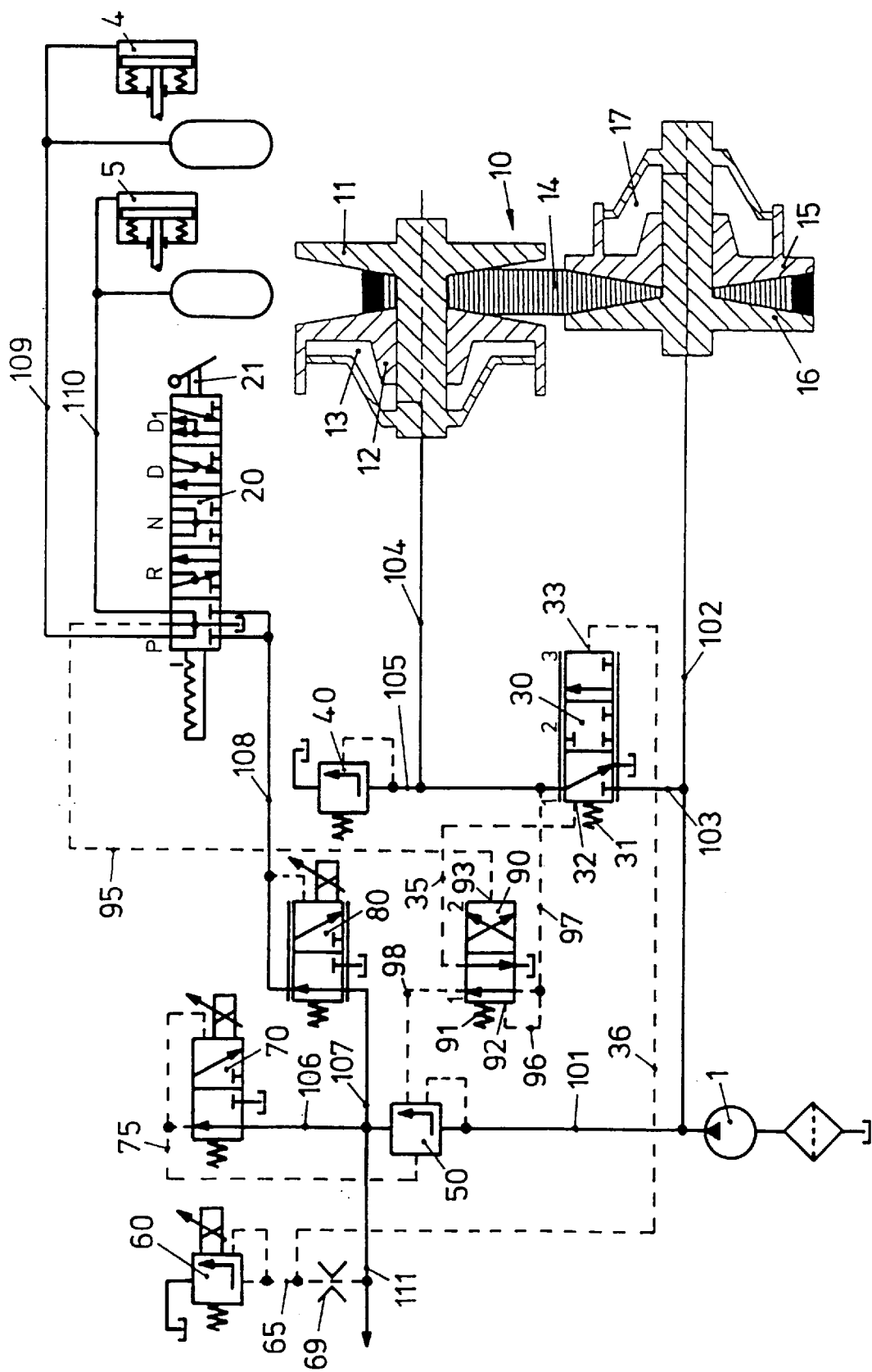

EMERGENCY HYDRAULIC CONTROL FOR CONTINUOUSLY VARIABLE TRANSMISSION WITH EXPANDED MANUALLY-OPERATED VALVE

BACKGROUND OF THE INVENTION

The invention is based on an emergency hydraulic control.

An electronically controlled, continuously variable transmission (continuously variable transmission, CVT) is described in not prepublished DE 195 19 162.5. The CVT transmission, which is preferably used in passenger cars, has a control for emergency driving operation which, in case of the outage or switch-off of the electro-hydraulic control for normal driving operations, assures the tensioning of the transfer means by simple hydraulic means. On the one hand, these means permit a start under load and on inclined sections without slipping of the transfer means and, on the other hand, permit a transmission change after the start from a high starting gear to a lower overdrive gear, so that overspeeding of the engine or too great a slippage between the driving wheels and the road is prevented.

In the known emergency hydraulic control, a signal, which is proportional to the rpm and which is used for a gear change between "low" and "overdrive", is obtained from the flow conveyed by the pump by inserting a throttle valve, which has the function of an orifice gauge. An additional magnet valve is required for this, which during normal driving operations lets the flow conveyed by the pump pass practically unthrottled and which switches in the throttle valve in an emergency. Furthermore, because of the temperature-dependent flow conveyed by the pump, the gear change is also temperature-dependent.

Furthermore, a hydraulic control is known among others from DE 42 34 103, by means of which the ratio between primary and secondary fluid pressure is maintained approximately constant over a defined gear range. A dependable start on inclines is not always assured with the aid of such a hydraulic circuit.

SUMMARY OF THE INVENTION

The emergency hydraulic control is needed for being able in case of an emergency to use a continuously variable transmission without the aid of an electro-hydraulic control, which is active under normal driving operations. With the emergency hydraulic control in accordance with the invention, during emergency operation because of an outage of the electronic control device, the transmission is automatically changed in the direction of "overdrive" by, among other things, an increase in the primary fluid pressure. To be able to change the transmission in the direction of "low", for example for hill climbing under optimum load or for starting, the driver manually, or possibly also by means of other muscle power, intervenes in the control. The regular manual gearshift valve, which is actuated via a drive position selection lever, is given an additional switch position "$D_1$". A valve controlled by a manual gearshift valve causes the hydraulic control to lower the primary fluid pressure and to raise the secondary fluid pressure, because of which the transmission is displaced in the direction of "low". The switch position "$D_1$" corresponds to the greatest gear. It is solidly set by means of the drive position selection lever.

The concept of letting the driver choose between two positions for forward driving is independent to a large degree from the principle of the control of the gear changes outside of the "low" range.

BRIEF DESCRIPTION OF THE DRAWINGS

An exemplary embodiment of the invention is schematically represented in the form of a hydraulic circuit diagram, and will be explained in the following description of the drawing FIGURE.

DESCRIPTION OF THE PREFERRED EMBODIMENT

FIG. 1 shows a hydraulic circuit diagram for controlling the hydraulic fluid pressures in the pressure cylinders on the power input and output sides of a continuously variable transmission. The known transmission (10) contains two pairs of conical disks, between which a transfer means (14), for example a thrust-link belt, a chain, a V-belt or the like, is arranged. Both pairs of conical disks respectively consist of two conical disks (11, 12; 15, 16), which are embodied to be hydraulically braced against each other. The piston and cylinder elements necessary for this are preferably integrated into at least one portion of the conical disks. The piston chambers enclosed by these elements, the piston chamber (13) on the primary side and the piston chamber (17) on the secondary side, are charged with the respective service pressure in accordance with the selected gear.

In the embodiment herein described, the required secondary fluid pressure on the power output side is greater than or equal to the required primary fluid pressure on the power input side. Under normal driving conditions, for example when the 6/5-way valve (20), which can be actuated by a manual lever (21), is in a gear position "D", the piston chambers (13) and (17) are provided with hydraulic fluid by a hydrostatic pump (1), driven by the vehicle engine, for example. The pump (1) conveys the pressure medium through the service lines (101) and (102) into the secondary piston chamber (17).

Two pressure regulating valves (60) and (70) set the secondary pressure required for the respective driving state.

The pressure regulating valve (70) is a 3/2-continuous way valve, which has a restoring spring on the left side and, besides a hydraulic actuation, a controllable electromagnetic actuation on the right side. A service line (106) terminates at an inflow connector. The service line (106) is connected with the service line (101) via a secondary valve (50), a hydraulically remote-controlled differential pressure regulator. The service connection of the valve (70) is connected on the one hand with the hydraulic control connector on the right side, and on the other hand via a control line (75) with the control connector on the left side for the differential pressure regulator (50). By means of this the output pressure of the differential pressure regulator (50) is reduced in respect to the input pressure by an amount which is the function of the intermediate position of the valve (70).

The pressure regulating valve (60) is a pressure relief valve with a controllable electromagnetic actuation. It is connected to the service line (106) via a control line (65) and and service line (111). An orifice valve (69) is seated in the control line (65).

The service line (111) leads to further modules, not represented here, of the hydraulic circuit.

The primary fluid pressure in the piston chamber (13) is set with the aid of a 3/3-continuous way valve (30). The primary valve (30), which is supplied via a service line (103) from the secondary service line (102), is connected via a service line (104) to the piston chamber (13). A service line (105) branches off the service line (104) and terminates in a pressure relief valve (40). The valve (40) limits the primary fluid pressure.

The primary valve (30), a 3/3-continuous way valve with two flow-through positions and a center blocking position has, besides the hydraulic actuators with the control connectors (32) and (33) on both sides, a restoring spring (31) on the left side. A control line (36), which branches off the control line (65) between the orifice valve (69) and the pressure relief valve (60), terminates at the control connector (33). A control line (35) leads to a right service connector of a reversing valve (90).

The reversing valve (90) is a 4/2-way valve with a flow-through and a return flow position. A restoring spring (91) arranged on the left side can, besides a hydraulic actuation with a control connector (92), keep the valve (90) in the switching position 1, the flow-through position. A hydraulic actuator with a control connector (93) is also provided on the right side. The inflow connector of the reversing valve (90) is on the one hand connected via a control line (97) with the service line (104), and on the other hand via a control line (96) with the control connector (92) of the hydraulic actuation on the left side. A control line (98) connects a right control connector of the differential pressure regulator (50) with the left service connector of the reversing valve (90). The control connector (93) leads to the central service connector of the manual switching valve (20).

A service line (108), which is supplied via a connecting valve (80) from the service lines (106) and (107), leads to the inflow connector of the manual switching valve (20). At least functionally, the connecting valve (80) has the same structure as the pressure regulating valve (70) represented adjoining it.

The manual switching valve (20) has five switching positions. The right switching position "P" and the center switching position "N" have similar functions. In these switching positions the cylinders (4) and (5) of the starter clutches for forward or reverse driving are relieved via the valve, for example into a reservoir. To this end the cylinder (4) is connected via the service line (109) to the left service connector of the valve (20), and the cylinder (5) via the service line (110) to the right service connector. In the valve slide, all three service connectors are connected with the return flow connector. The two inflow connectors are blocked.

The switching position "D" is located to the right of the center switching position. By means of it the right inflow connector is blocked and the left inflow connector is connected with the left service connector. Thus pressure fluid can flow via a service line (108) into the service line (109), by means of which the cylinder (4) and its parallel connected pressure reservoir are charged with pressure. In this switching position the center and right service connectors are connected with the return flow connector, wherein on the one hand the cylinder (5) is relieved via the service line (110), and on the other hand the control line (95).

The right switching position "$D_1$" is modified in respect to the switching position "D" in that the left inflow connector is connected with the left and the center service connectors, while the right service connector leads directly to the return flow connector.

In the switching position "R" located on the left next to the switching position "N", the cylinder (5) is charged with pressure from the service line (108), while the cylinder (4) and the control line (95) are relieved. To this end, the right inflow connector is connected with the right service connector, and the left service connector, together with the center one, is connected with the return flow connector. The left inflow connector is blocked.

During normal driving operation the manual switching valve (20) is in the switching position "D". The control line (95) is relieved, so that the reversing valve (90) remains in the switching position 1. The control line (35) between the primary valve (30) and the reversing valve (90) is relieved toward the reservoir. In case of an outage of the electro-hydraulic control, the electromagnetic actuation element of the pressure valves (60) and (70), among others, are no longer supplied with current. As a result, the hydraulic fluid pressure in the control lines (65), (36) and (75), among others, rises to its maximum value. Besides the secondary fluid pressure rising because of this, the primary fluid pressure also increases, since the primary valve (30) moves into its switching position 3. Since because of this the remote-control pressure acting via the control lines (97) and (98) on the differential pressure regulator (50) also increases, the secondary fluid pressure falls to a medium level. The gear transmission displacement is displaced in the direction toward "overdrive".

For starting, the driver places the manual switching valve (20) into the switching position "$D_1$" by means of the manual lever (21). Because of this, the control line (95) located between the manual switching valve (20) and the reversing valve (90) is supplied with hydraulic fluid. The clutch pressure acting on the control connector (93) of the reversing valve (90) because of this causes a switch into the switching position 2 there. Pressure medium flows at primary fluid pressure into the control line (35) via the service connector of the reversing valve (90). The primary valve (30) moves in the direction of the switching position 1, because of which the primary hydraulic pressure drops. The gear transmission ratio "low" is set. The control line (98) is simultaneously relieved into the reservoir, so that the secondary valve (50) almost closes and the secondary fluid pressure rises to is maximum level, because of which the binding power between the conical disks (15) and (16) is sufficiently increased, so that a slippage of the transfer means during starting is dependably prevented.

If during normal driving operation a driver should accidentally select the switching position "$D_1$", this would be the equivalent of a sudden downshift. Such switching operations take the engine and the transmission to their load limits. To protect the engine and the transmission, the control line (96) is connected to the control connector (92) of the reversing valve (90). The control line (96) branches off the control line (97), so that the high primary fluid pressure of the reversing valve (90) is maintained in the switching position 1. Only after the primary fluid pressure has dropped by a defined amount in the course of the slowly reversing valve (90), does the transmission change gears.

In place of the mechanical spring restorations, which possibly can also be regulated in respect to the spring rate, it is also possible to partially use hydraulic actuators in the valves represented in FIG. 1.

What is claimed is:

1. An emergency hydraulic control for a continuously variable transmission having hydraulically axially displaceable conical discs, to control a transmission-dependent change of hydraulic fluid pressures in a first hydraulic axial displacement and a second hydraulic axial displacement of the conical discs of the continuously variable transmission, the emergency hydraulic control comprising a manual switching valve (20) configured and operated for selecting at least one drive stage by respectively selecting gear positions for at least two forward running operations (D, $D_1$), for a reverse running operation and for idling so that the emergency hydraulic control controls said transmission during an emergency driving operation in an overdrive gear stage, and a low gear stage is set during the emergency driving by switching to a gear switching position ($D_1$) for a forward running operation.

2. The emergency hydraulic control as defined in claim 1, and further comprising a pump supplying at least a piston chamber of said second hydraulic axial displacement; a downstream-connected remote-controlled differential pressure regulator valve (50); at least one electro-magnetically actuable pressure relief valve (60) limiting a fluid pressure; a continuous way valve (30) having an opening movement in a flow-through position controlled by a pressure upstream of said pressure relief valve so that said pressure relief valve supplies a piston chamber (13) of said first hydraulic axial displacement through said continuous way valve; a remote-control line (97,98) arranged so that said pressure relief valve also supplies a remote control leading to said pressure regulator valve with an opening function via said remote-control line; at least two clutches (4,5) arranged so that said forward running operations said reverse running operation and said idling are selectable by switching said gear positions of said manual switching valve for triggering said at least two clutches; separate service lines (109,110) through which said at least two clutches are supplied, said clutches being formed so that in respect to a clutch triggering, said gear switching position ($D_1$) of said manual switching valve corresponds to a gear switching position for said forward running operations; said manual switching valve in addition to connectors having a service connector which in the gear switching positions for said forward running operations, said reverse running operation and said idling is connected with a reverse flow connector and in the gear switching position ($D_1$) is connected with an inflow connector; a further service connector leading via a further service line (95) to a control connector (93) of a reversing valve (90) and in case it is triggered said reversing valve blocks said remote control line (97,98) and in a process relieves a line element (98), and charges a relief control line (35) which is connected to said continuous way valve at a side of a reverse position with primary fluid pressure.

3. The emergency hydraulic control as defined in claim 2, wherein said manual switching valve is a manual lever-activated 6/5-way valve with two inflows, one reverse flow and three service connections, wherein a switching position for idling is provided twice.

4. The emergency hydraulic control as defined in claim 2, wherein an inflow connector of said manual switching valve is charged with a clutch pressure which supplies said at least two clutches.

5. The emergency hydraulic control as defined in claim 2, wherein said reversing valve is a 4/2 continuous way valve which is actuated on both sides and has a flow-through and a reverse flow position; and a restoring spring (91) arranged on a side of said flow-through position.

6. The emergency hydraulic control as defined in claim 5, wherein said restoring spring has an adjustable spring force.

* * * * *